United States Patent Office.

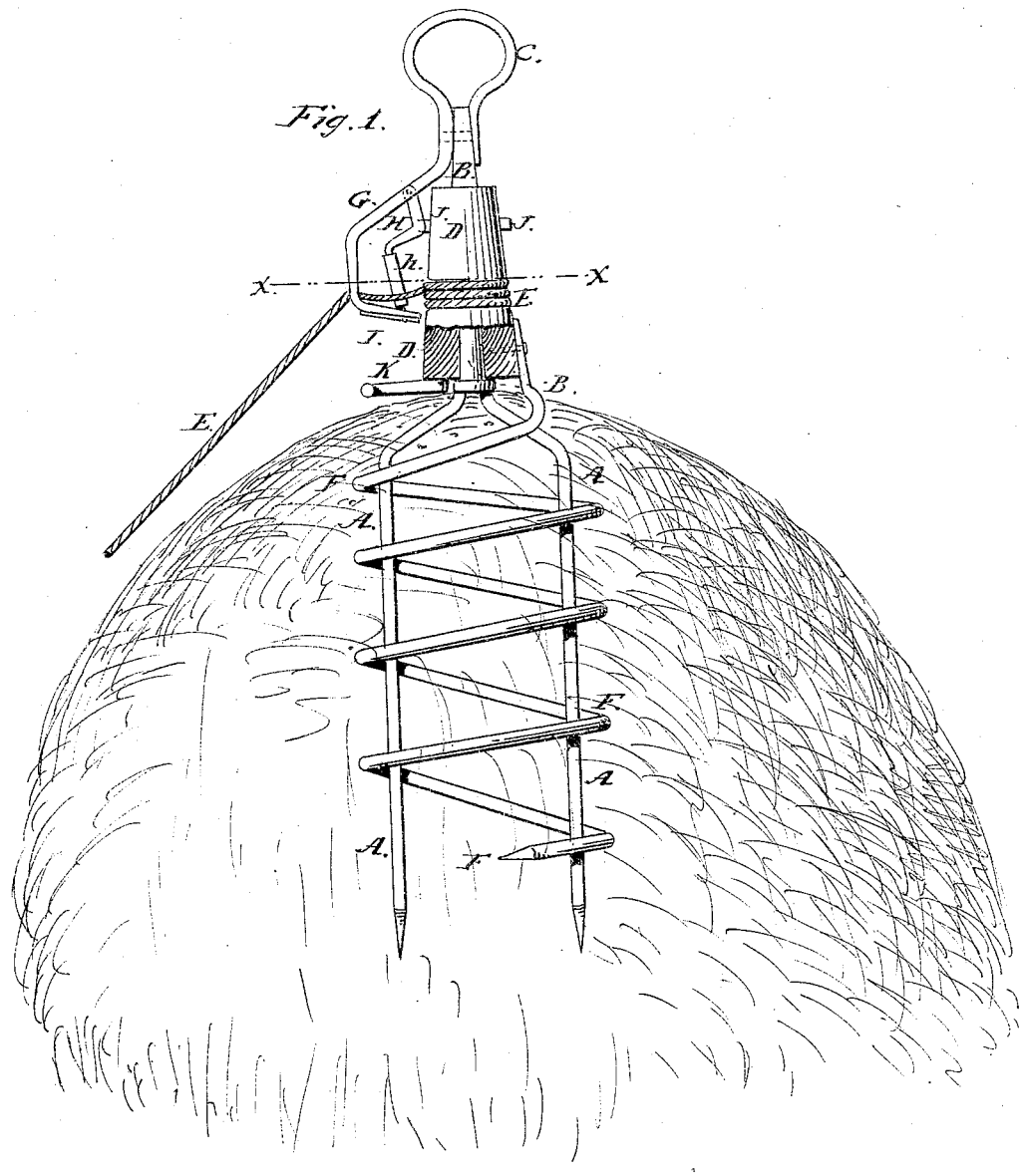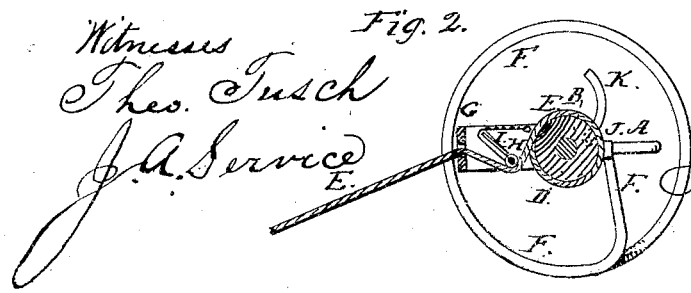

HENRY NEUMEYER, OF MILLERSTOWN, PENNSYLVANIA.

Letters Patent No. 63,554, dated April 2, 1867.

IMPROVEMENT IN SPIRAL HAY-FORK.

*The Schedule referred to in these Letters Patent and making part of the same.*

TO ALL WHOM IT MAY CONCERN:

Be it known that I, HENRY NEUMEYER, of Millerstown, in the county of Lehigh, and State of Pennsylvania, have invented a new and improved Spiral Hay-Fork; and I do hereby declare that the following is a full, clear, and exact description thereof, which will enable others skilled in the art to make and use the same, reference being had to the accompanying drawings, forming part of this specification, in which—

Figure 1 is a side view of my improved hay-fork, part of the roller or pulley being broken away to show the construction.

Figure 2 is a cross-section of the same, taken through the line $x$ $x$, fig. 1.

Similar letters of reference indicate like parts.

My invention has for its object to furnish an improved hay-fork, simple in construction, easily operated, and effective in its operation; and it consists of an improved spiral hay-fork, formed by the combination of the vertical tines, shank, roller or pulley, and one or more spiral tines, rope, lever stop, supporting-frame, and spring with each other, as herein more fully described.

A are the vertical tines, the upper parts of which are bent or curved towards each other, and their upper ends securely attached to the lower end of the shank B, as shown in fig. 1. Upon the upper end of the shank B is formed, or to it is attached, a ring or loop, C, to which is attached the end of the rope by which the fork is raised and suspended. The middle part of the shank B is made round, and upon it is placed a roller or pulley, D, the face of which may be grooved for the reception of the rope E, by means of which the hay is discharged from the fork. The roller or pulley D revolves freely upon the shank B, and to its lower part is securely attached the upper end of the spiral tine F, as shown in fig. 1, the lower end of said spiral tine terminating a little above the lower ends of the vertical tines A, so that the said spiral tine may be supported against any side pressure arising from the unequal balancing of the fork load. The drawings represent only one spiral tine F as being attached to the lower part of the roller or pulley D; but more than one may be used if desired. G is a bent arm, frame, or support, attached to the upper end of the shank B, the lower end of which terminates near the lower part of the roller or pulley D, as shown in fig. 1. To the upper part of the support G is pivoted the upper end of the lever stop H, the lower end of which passes through, and works in, a slot formed in the lower part of said support, where it is held in whatsoever position it may be placed by the pressure of the small spring I attached to the lower part of said support G. Upon the lever stop H is placed a roller, $h'$, to relieve the friction of the rope E. J are stops, attached to the sides of the roller or pulley D, which, when the lever stop is pushed towards said roller, come in contact with it, and prevent the pulley from being revolved by the pressure of the hay upon the spiral tine, which might cause the load to be discharged before reaching the required place. E is a rope, one end of which is attached to the pulley or roller D; thence it passes through a slot in the side of the support G, and passes down into such a position that it can be readily reached by the operator. In using the fork it is placed upon the hay to be raised point downwards. Then, by turning the roller D, by means of the small lever or handle K attached to its lower end, the spiral tine F is forced into the hay, the vertical tines A passing down into said hay vertically; and, at the same time, the rope E is wound around the said roller. When the fork has been properly adjusted in the hay, the lever stop H is moved towards the said roller to prevent the hay from being discharged from the fork too soon, as before described. When the loaded fork has reached the desired position, by pulling upon the rope E, the lever stop H is drawn back, and the roller D revolved, turning the spiral tine F out of the hay, and allowing the said hay to drop from the fork. If the spiral tine F is made with an inclination of from twenty-five to thirty degrees, the weight or pressure of the hay alone will revolve the said tine, and discharge the hay. In this case no more power need be applied to the rope E than enough to draw back the lever stop H.

What I claim as new, and desire to secure by Letters Patent, is—

The vertical tines A, shank B, roller or pulley D, and one or more spiral tines F, in combination with the rope E, support G, lever stop H, and spring I, substantially as described for the purpose specified.

The above specification of my invention signed by me this 25th day of September, 1866.

HENRY NEUMEYER.

Witnesses:
SOLOMON REINSMITH,
SAML. R. RITTENHOUSE.